(No Model.)  5 Sheets—Sheet 1.
E. B. CUMMINGS.
VOTING MACHINE.
No. 585,743.  Patented July 6, 1897.
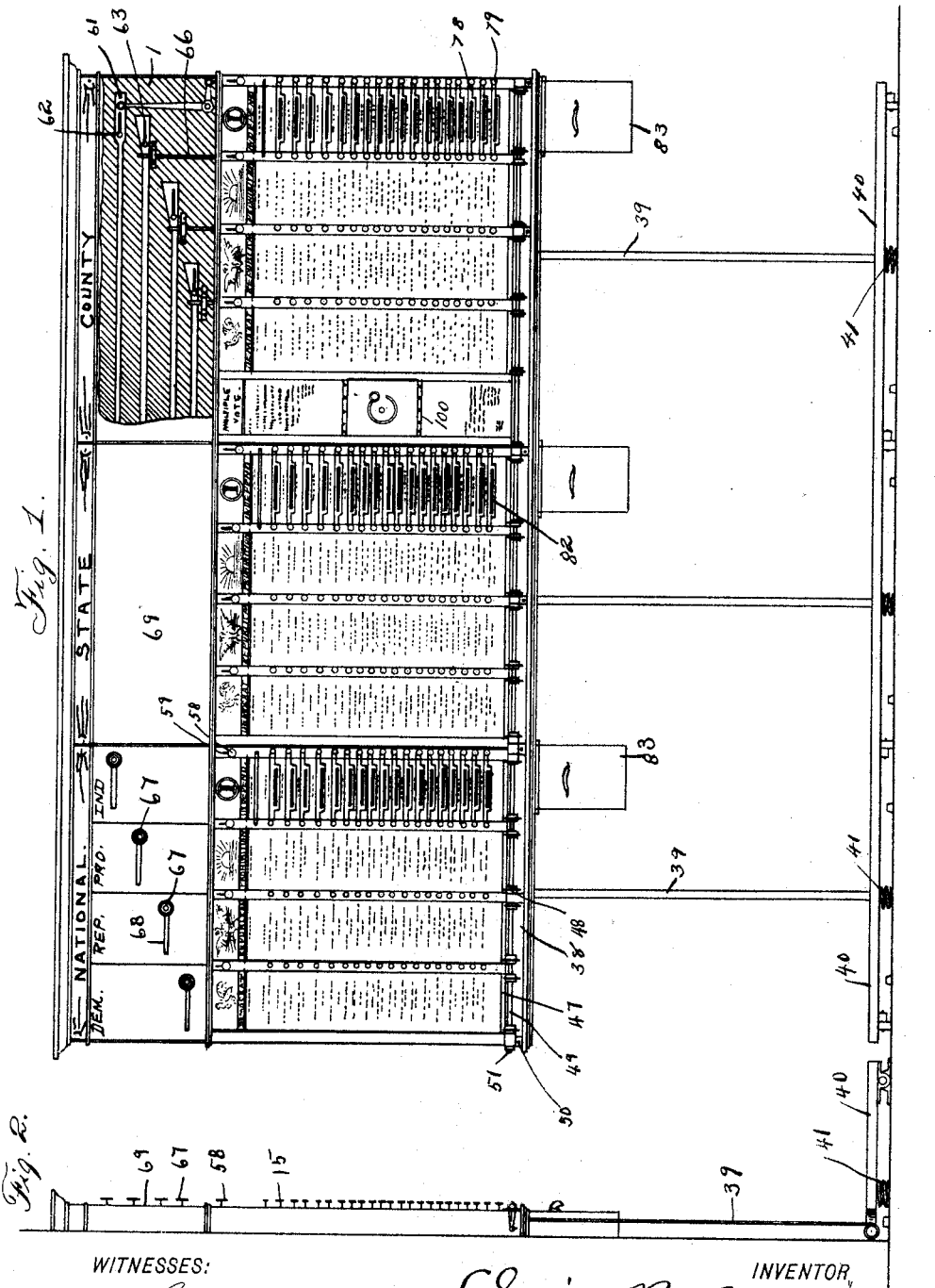
WITNESSES:  INVENTOR,
A. S. Cantright.  Edwin B. Cummings
Zula Green.  BY
 H. Lockwood
 His ATTORNEY.
THE NORRIS PETERS CO., PHOTO-LITHO., WASHINGTON, D. C.

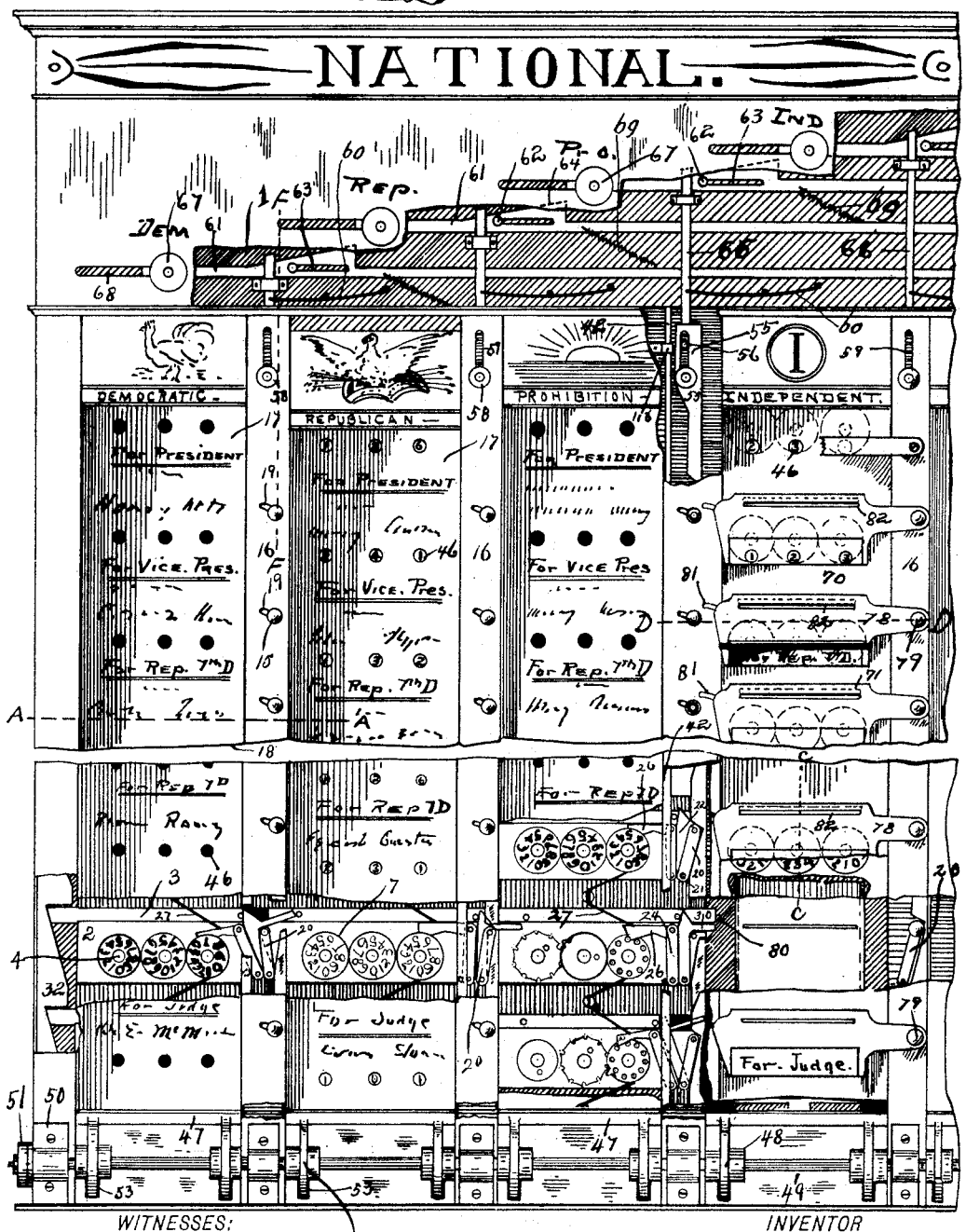

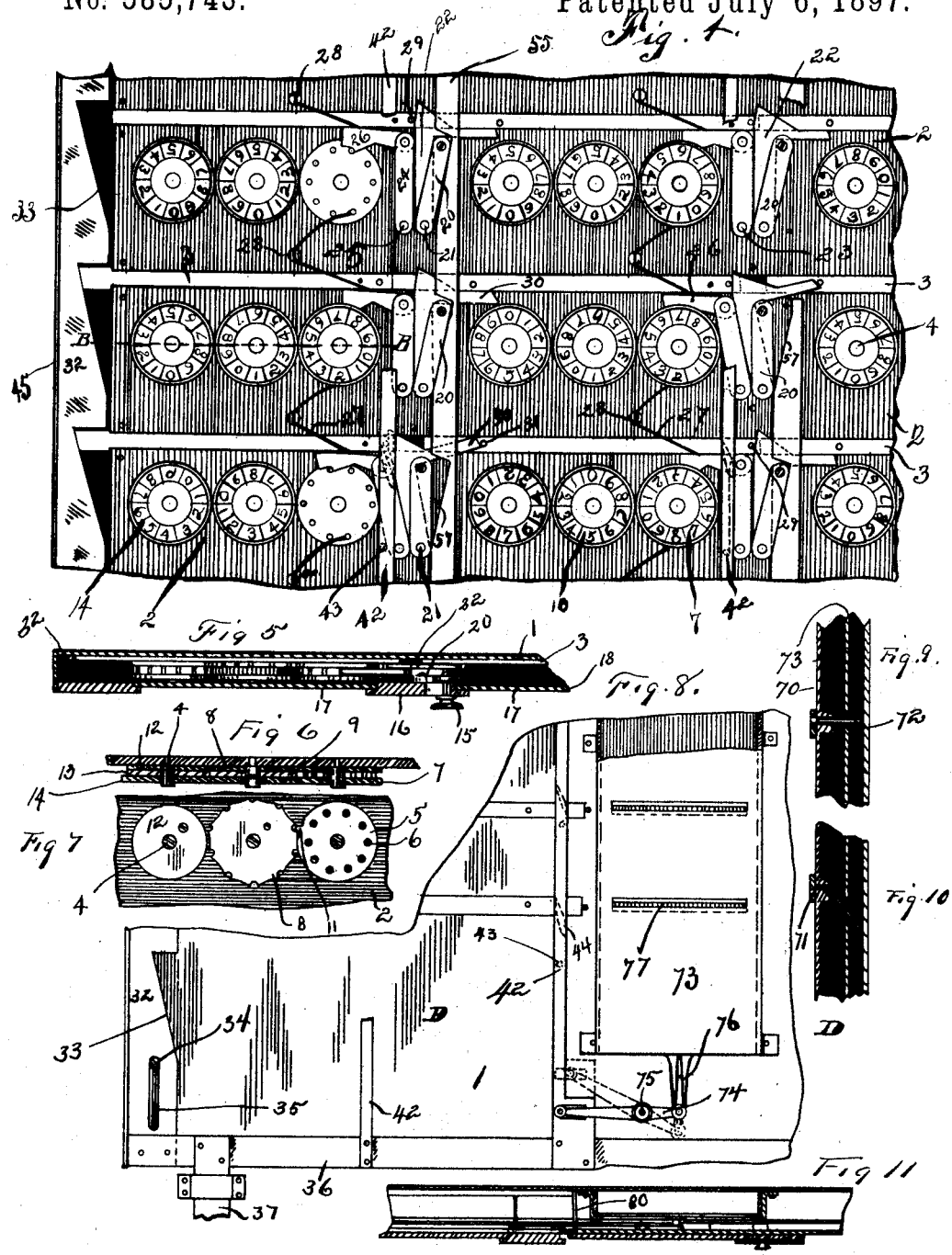

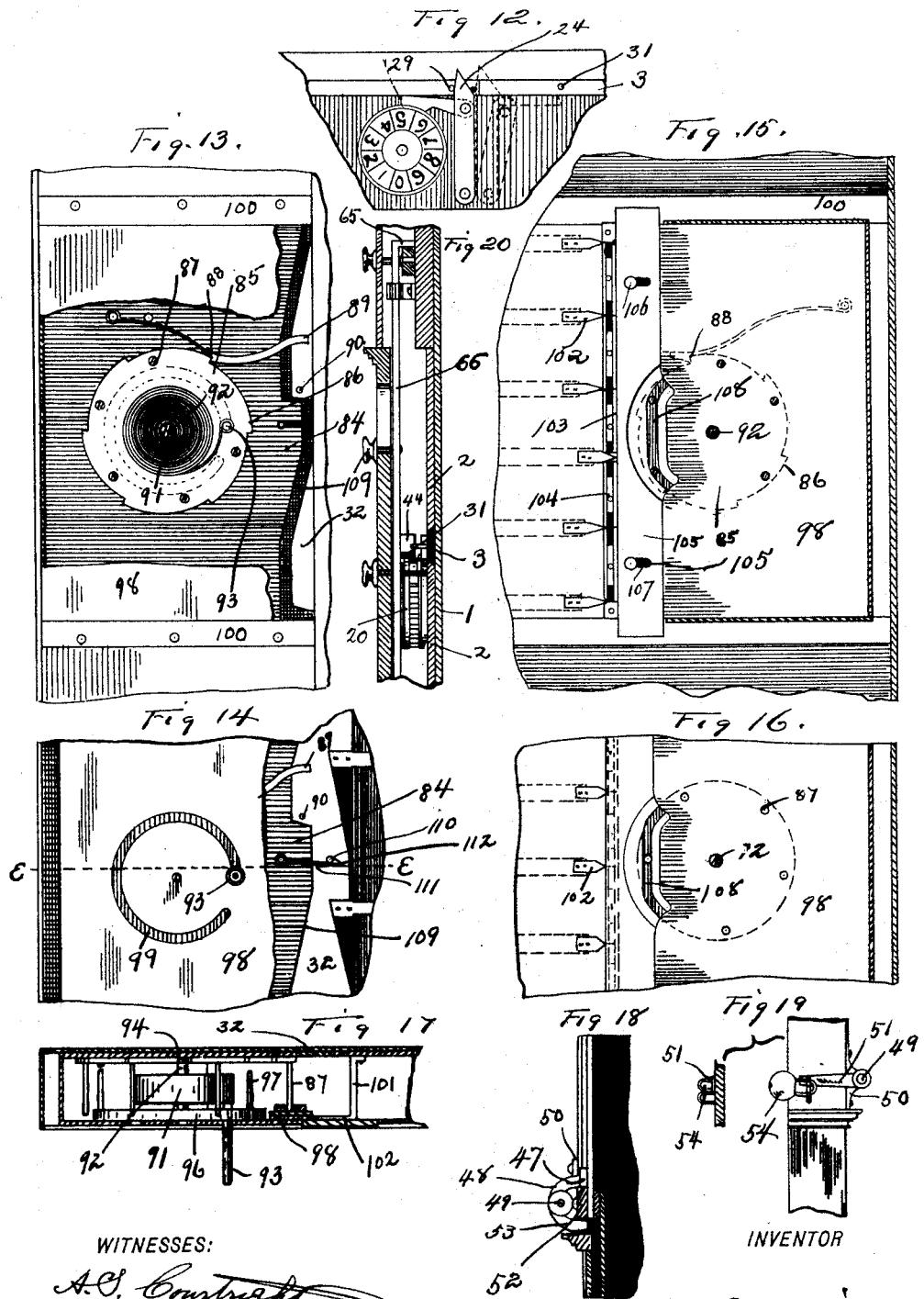

(No Model.) 5 Sheets—Sheet 5.
E. B. CUMMINGS.
VOTING MACHINE.
No. 585,743. Patented July 6, 1897.
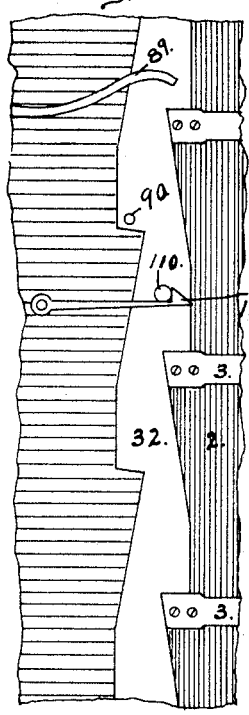
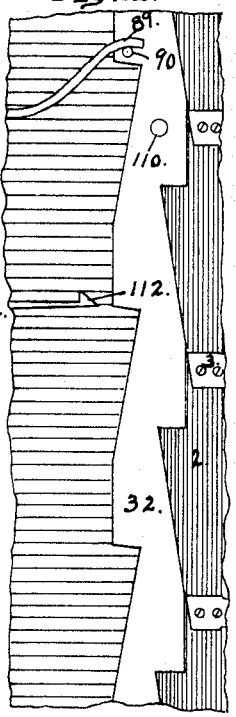
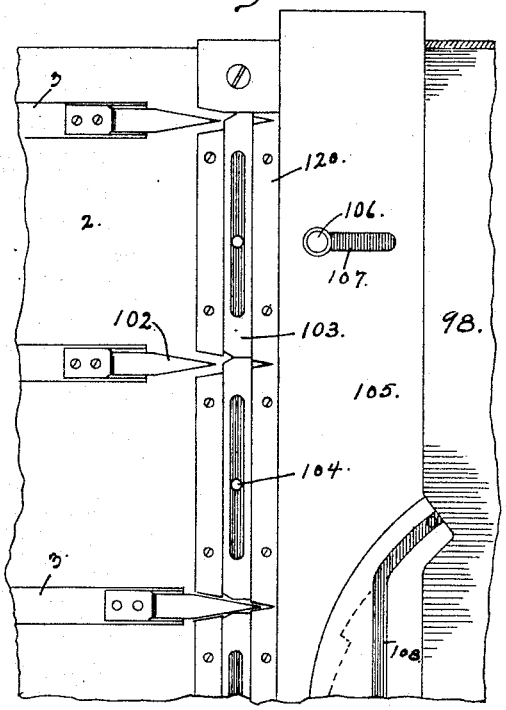
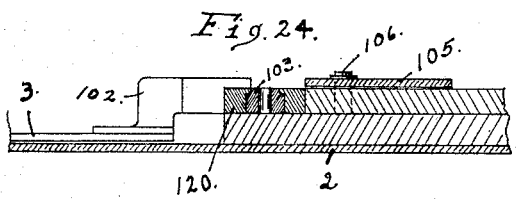
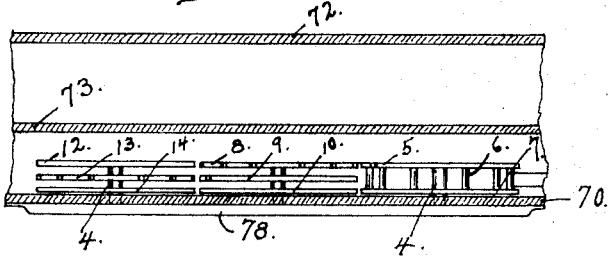
WITNESSES:  
INVENTOR  
BY  
ATTORNEY.

UNITED STATES PATENT OFFICE.

EDWIN B. CUMMINGS, OF INDIANAPOLIS, INDIANA.

VOTING-MACHINE.

SPECIFICATION forming part of Letters Patent No. 585,743, dated July 6, 1897.

Application filed February 29, 1896. Serial No. 581,235. (No model.)

*To all whom it may concern:*

Be it known that I, EDWIN B. CUMMINGS, of Indianapolis, county of Marion, and State of Indiana, have invented a certain new and useful Voting-Machine; and I do hereby declare that the following is a full, clear, and exact description thereof, reference being had to the accompanying drawings, in which like figures refer to like parts.

My invention relates to improvements which I have made and introduced into the voting-machine shown and described in an application for Letters Patent filed by me on March 27, 1895, its serial number being 543,430.

The objects of these improvements are to simplify the working parts, to give the voter greater latitude where there are multiple candidates for the same office on multiple tickets, to provide means for voting for candidates whose names are not on any of the regular tickets, to divide my voting-machine into sections, there being one section for the national tickets, one for the State, one for the county, &c., and to provide means connected up with all these sections whereby a straight ticket may be voted in all the sections simultaneously by the operation of a single key. This enables me to use such sections of my machine as may be required for a county election only or a State election only, dispensing with the remainder of the sections, if desired, or when there is an election for candidates on several classes of tickets, as I have just described, the sections will when combined form practically one machine. It is clear, therefore, that by adding or dispensing with sections I can adapt my machine for use in any sort of election, whether it be a national election, or a township or municipal election, or merely an election of officers in a society of any kind. Furthermore, each section of my machine is composed of sections, whether you look at it from a vertical or horizontal standpoint. I provide a vertical section for each party-ticket as well as for independent voters, and I provide a horizontal section for the candidates for each office, the arrangement being such that I can add or dispense with sections in either direction, so as to adapt the machine to suit the requirements of any sort of election. Therefore it is clear that this machine would not have to be thrown away if fewer tickets or candidates were to be voted for or if more tickets and candidates were to be voted for than the machine provided for, as in such case, if enlargement be required, nothing need be changed excepting the size of the base-plate, which of course should be large enough to have mounted upon it the various sections of the machine. The full nature of these improvements will appear from the accompanying drawings and the description following.

In the drawings, Figure 1 is a front elevation of my voting-machine adapted to be used for voting at a combined national, State, and county election, a part of the face-plate in the upper portion of the machine being broken away to disclose the connecting means between the sections. Fig. 2 is an end view of the same. Fig. 3 is a front elevation of the section of the machine devoted to the national ticket, with portions of the face-plate and ballots or front part of the machine broken away to disclose the internal mechanism, and the same is cut out centrally and horizontally to enable me to show the upper and lower portion of the machine in one figure. Fig. 4 is a front elevation of a portion of a section of the machine with the face-plate and ballots entirely removed, being on a scale larger than Fig. 3. Fig. 5 is a cross-section of a portion of Fig. 3 on the line A A. Fig. 6 is a cross-section of a portion of Fig. 4 on the line B B. Fig. 7 is a front elevation of a portion of the registering-wheels, the indicating-wheels being removed. Fig. 8 is a front elevation giving details of the construction of the portion of the machine provided for voting independent ballots. Fig. 9 is a vertical section of a portion of Fig. 3 on the line C C, showing an independent ballot just inserted in the machine. Fig. 10 is the same, showing the ballot as it is being carried downward in the machine. Fig. 11 is a horizontal section of the portion of the machine devoted to voting independent ballots, being on the line D D of Fig. 3. Fig. 12 is a detail of the register of the multiple-voting portion of my machine and the pawls or means for actuating such register when the same is used for cumulative voting. Fig. 13 is a front elevation of the multiple-voting repeater with some parts of the face-plate broken away. Fig. 14 is a front elevation of the central portion of the same with the face-plate partly broken away. Fig. 15 is a central section of the repeater with one key voted. Fig. 16 is the same after it has been unlocked or reset. Fig. 17 is a cross-section of this repeater on the line of E E, Fig. 14. Fig. 18 is a sectional detail view of the rocking bar which supports the ballots. Fig. 19 is a detail of the means outside of the voting-machine for locking said rocking bar, so that the vote will not be revealed in an unlawful manner. Fig. 20 is a section on the line F F of Fig. 3. Fig. 21 is an enlarged view of the right-hand portion of Fig. 14. Fig. 22 is the same after the unlocking-bar has been elevated. Fig. 23 is an enlarged view of the right-hand portion of Fig. 15. Fig. 24 is a cross-section of Fig. 23. Fig. 25 is a cross-section of the independent-ballot portion of the machine just over and showing in plan the registering and indicating mechanism.

In the first place I will describe the portions of my machine that are designed to enable the voter to register one vote for one candidate for each office and no more. The mechanism is all mounted upon a base-plate 1, made, preferably, of sheet metal, and the working parts are mounted on it in planes parallel with it. To this base-plate I secure a series of horizontally-extended bed-plates 2. These plates serve two purposes. They carry the registering and actuating mechanism for voting for all the candidates for any one office on the regular ballots, and also they serve as guides between which the locking-bars 3 may be moved. The edges of these plates are beveled so that the adjacent edges of two plates form a dovetailed groove or guideway, and the edges of the locking-bars are beveled to fit in said guideway and to be held in by the edges of said plates 2. As will hereinafter appear, this construction enables me to increase the capacity of my machine by merely adding more of these plates 2, and, furthermore, any one of them could be readily removed altogether with the mechanism mounted on it, if such thing should be found at any time desirable. On said plates 2 I place the following mechanism: The bearing-pins 4 are fixed in said plate perpendicular to its plane and in a line with each other. On these bearing-pins the registering and indicating wheels are mounted. The units-register is composed of a one-toothed wheel 5, having on it extending perpendicularly from its face ten pins 6. Adjacent to said wheel is the indicating-wheel 7, having the ten digits or numerals correctly spaced and placed upon its face. The tens-register is composed of a tens-wheel 8, a one-toothed wheel 9, and an indicating-wheel 10. The tens-wheel 8 is actuated by the tooth 11 on the wheel 5 of the units-register. The hundreds-register is composed of a washer 12 and a tens-wheel 13 and an indicating-wheel 14. The indicating-wheels are secured by rivets or screws to the adjacent wheels. The units-indicating wheel, however, is preferably secured to the ends of some of the pins 6, as is seen in Fig. 6. The number of registering and indicating wheels, it is obvious, may be multiplied to accommodate the number of voters, and other forms of registering and indicating mechanisms might be substituted for that which I have shown, as in this application I claim no invention in the construction of the registering and indicating mechanism.

The locking-bar 3 has heretofore been explained as mounted between the bed-plates 2. I make my locking-bar sectional, there being one section provided for each candidate. When a voting-key is operated, one of these sections is actuated, and through it other sections may be actuated, as will hereinafter appear. The mechanism for driving the registering-wheels and actuating the locking-bar will now be described. The voting-key 15, which is placed beside the name of the candidate for office, extends through the face-bar or vertical bar 16, that is located between the ballots 17, seen beneath the glass strip 18. The ballot, as here shown, is secured on the under side of the glass strip, or any other transparent cover might be used. The keys 15, that extend through the face-bar 16, operate in the arc of a circle through the slots 19 in said face-bar 16. The key 15 at its inner end is secured to the arm 20, as seen in Fig. 4, which is pivoted at its lower end to the face-bar 16 by the pivot-pin 21. It is left free to return after being operated, as repeating is impossible for the reasons hereinafter appearing. Between the arm 20 and the plate 2 there is an angle-piece 22, pivoted at its lower end on the pivot-pin 21, that is secured to the plate 2, as appears in Fig. 4. Said angle-piece is actuated by the shank of the key 15, which extends through the upper end of the arm 20 and beyond it, so that it will engage the said angle-piece, as appears in Fig. 20. This angle-piece 22, when actuated by the key 15, moves the arm 24, which is likewise pivoted at its lower end to the plate 2 by the pivot 23. Said arm 24 on its upper end carries the gravity-pawl 26, that engages the pins 6 in the wheel 5 of the units-registering mechanism, and when said pawl is pushed by the operation of the key and the angle-piece it moves said wheel one notch. The movement forward of said pawl 26 is limited by the said slot 19 in the face-bar 16, through which the key 15 operates, so that it cannot move more than one notch and therefore cannot register more than one vote by reason of one operation of the key. Said pawl is not only held down in the engagement with the wheel, which it has just actuated, by gravity, so that it cannot move back of its own accord, but the spring 27 engages it and holds it down. This spring is secured to the plate 2 by the screw or bolt 28 and has an upward-extending arm, that engages the pins 6 in the wheel 5 of the units-registering mechanism and prevents any backward movement of said wheel. Said angle-piece 22, when actuated by the key 15, also actuates a section of the locking-bar 3 by reason of its engagement with the pin 29 in said bar, as is seen in the lower left-hand corner of Fig. 4. When a section of the locking-bar is thus moved, all other sections of said locking-bar in front of it, those to the left, as shown in the drawings, are likewise moved; but the sections of said locking-bar to the rear—that is, to the right, as shown in the drawings—are locked by reason of the heel 30 of the angle-piece 22 being elevated as the angle-piece is moved forward and engaging the pin 31 on the first section of the locking-bar to the rear. The angle-piece will not fall back into its original position and cannot be moved into such position except by means of the resetting mechanism hereinafter explained. This is because gravity holds said angle-piece in this forward position, and any amount of pressure or movement of the key 15 cannot throw said angle-piece backward into the position whereby its movement could be repeated by the same voter.

When the first section to the rear is locked, as has been explained, it is obvious that no other section to the rear can be operated, as they all abut closely against each other, and when the forward section has been operated no other forward section can be operated, as said sections abut against each other closely, and the section at the end, after it has been actuated, engages the unlocking-bar 32, so that after one key in a horizontal row has been operated it is obvious that no other key in said row can be operated except when its action is modified by the multiple-voting mechanism, which will be hereinafter explained. By the two arms 20 and 24 and the angle-pieces 22 of the actuating mechanism being independent of each other and independently mounted I am enabled to dispense with hooks on the locking-bars and teeth on the unlocking-bar 32 and the spring-catch connecting the sections of my locking-bars, and have also an independent drive mechanism for the registers and the locking-bars, and the key is so disconnected that after it has been once operated any additional movement or operation can have no effect whatsoever. Hence nothing can be gained by an attempt to tamper with the machine or "beat" it by operating through the keys.

The unlocking and resetting mechanism will next be described. It has been explained that the locking-bars when actuated move into engagement with the unlocking-bar 32 on the left-hand side of the machine, as shown. This unlocking-bar is mounted in the framework, so as to be vertically reciprocal. Its inner edge is provided with inclined faces 33, against which the ends of the locking-bars bear. In the drawings, the unlocking-bar 32 is in a downward position, so that when the locking-bar is actuated the left-hand end of said bar engages the upper portion of said inclines and further operation of said locking-bar is impossible, and since there is no means whereby said locking-bar can be pulled back into its original position hooks or other engagement of similar character between the locking-bar and unlocking-bar are needless. Said unlocking-bar 32 is guided in this vertical movement by the pins 34 in the base-plate that extends through the slots 35 in such bar, as seen in Fig. 8, where the lower end of said bar is shown. The lower end of said unlocking-bar 32 is secured to the main resetting-bar 36, which extends across the machine at the bottom, as seen in Fig. 8. The main resetting-bar 36 is connected by the strap 37 to the bar 38. (Shown in Fig. 8.) From this I extend a link 39 down to the false floor or platform 40, which is supported on helical springs 41. In the drawings I have shown my voting-machine fastened to a wall and the platform 40 located adjacent to the wall below the voting-machine and connected up with it by the link 39.

It is obvious that when the voter is voting the platform will be pressed down, and hence the unlocking-bar 32 be drawn downward in the position shown in Figs. 4 and 8. When, however, the voter leaves the platform or booth 40 that would surround the voting-machine, the springs elevate it, and through the connected mechanism described the unlocking-bar 32 is elevated and pushed upward, and when it is pushed upward the inclined faces 33 force the unlocking-bars over to the right into their normal position. When such locking-bars are thus forced over into normal position, the pins 29 force the angle-pieces 22 and the keys 15 into their normal position. The mechanism just described resets all parts of the machine which has heretofore been explained excepting the pawls that drive the registering mechanisms. These pawls are reset in the following manner: Adjacent to the inner side of the face-bar 16 I place a vertical reciprocal bar 42, movable in the guide 113, (seen in Fig. 3,) and having extending inward from it the pins 43, which engage the arms 24, and when said bar 42 is elevated throws said arms to the right into their normal position, and it is obvious that such movement of the arms withdraws the pawls pivoted at their upper ends. These bars 42 are likewise secured at their lower ends with the main resetting-bar 36, so that they are moved by the same means and at the same time as the unlocking-bar 32. This completes the operation of resetting, and the machine is then ready for another voter. Secured to the rear side of said reciprocal bar 42 I also place inclined lugs or shoulders 44, which engage the pins 29 in the locking-bars, and when said bar 42 is elevated pushes said locking-bars over to the right into their normal position. This is in addition to the unlocking-bar 32 and for the purpose of having double assurance that the locking-bars will be reset. With this last-described mechanism it is possible to omit the unlocking-bar 32 and let the locking-bars abut against the side of the casing 45, which would serve as a stop, limiting their movement just the same as the unlocking-bar 32, but the construction herein shown is safest and I consider it preferable.

The transparent plate 18 and the ballot, which in my drawings is secured thereto on the under side, slides in guideways formed in the edges of the face-bars 16, as seen in Fig. 5. Just beneath the names of the candidates I provide apertures 46 in the ballots, which, when the ballots are dropped downward into the position shown in the second column of Fig. 3, will register with the numeral on the indicating-wheels, there being one aperture for each wheel. Before the voting has commenced these indicating-wheels are set at zero, and as the voting progresses the votes for each candidate will be added and indicated; but it is desirable that the voters shall not be cognizant while voting of the total number of votes which any candidate has received, and therefore while the voting is in progress the ballot is held in the position shown in the first column in Fig. 3. For this purpose the ballots are supported on the cross-bars 47 at the lower end of the machine, there being one of such bars for each ballot. These bars 47 are carried on the curved arms 48, that are mounted on the shaft 49. The shaft is carried in the bearings 50, secured to the lower ends of the face-bars. At the end of such shaft and outside of the machine, as seen in Fig. 19, I provide a hand-lever 51. When I elevate such hand-lever, I turn the series of bars 47 back away from the machine somewhat, whereby they disengage the lower ends of the ballots and permit such ballots to drop down upon the cross-bar 52, which connects the lower ends of the face-bars 16. Then the ballots will be in the position shown in the second column of Fig. 3. This, however, is never done until after the election is ended, and is for the purpose of disclosing the vote to the election officials. Formed integrally with the arms 48 is a lower projecting arm 53, extending inward, so that when the said arms are rotated, as I have just described, by means of the shaft 49, the upper one moving away from the machine to let down the ballots, the lower one moves into an aperture provided for it in the casing to a point just below the resetting-bar 36. This is for the purpose of preventing the resetting-bar being operated thereafter until the machine is entirely rearranged for voting. Previous to an election the officials will elevate the ballots into the position shown in column 1 of Fig. 3 and will turn down the lever 51, so as to return the cross-bars 47 to the position just under the ballots to support them and hold them into place. Then the lever 51 is locked outside of the machine by the lock 54, so that nobody while voting can discover the vote of any candidate, as has been explained, nor can he in any manner get into the machine to tamper with it.

I will now to proceed to explain the means provided for voting straight tickets. In Fig. 4 there will be observed a vertical bar 55. It is guided in its vertical movement by the pin 56. The bar 55, which I call the "straight-ticket" bar, is provided on one side with inclined faces or shoulders 57, that engage the side of the bars 20 on which the voting-keys are mounted. Therefore it is obvious that when said straight-ticket bar 55 is elevated it actuates all of the arms 20 with which it engages and through the connecting mechanism, which has been explained, operates the entire voting mechanism for one party-ticket. Ordinarily this straight-ticket bar is operated by the key 58, that extends through the slot 59 at the upper end of the face-bar 16. When said key 58 is pushed upward, one vote is registered for every candidate on the ballot. After the key 58 on the straight-ticket bar 55 is pushed upward and operated it then drops back into its original position and performs no other service—that is, it does not in any manner hold the actuating mechanism in place after the same has been actuated or locked in the mechanism, but it is perfectly free to be moved, if desired, but cannot produce any effect until the machine has been reset. The spring 60, secured to the base-plate 1 and engaging the straight-ticket bar 55, assists gravity in returning said bar to its normal position.

The mechanism I have just described is the means I employ when a section is separately used; but when two or more sections are used, like the three, as shown—that is, one for the national ticket, one for the State, and another for the county ticket—I provide the following mechanism for voting the straight tickets: A series of horizontal reciprocating bars 61 are carried by the pins 62, that are in the base-plate 1, said pins extending through the slots 63 in the bars 61, so that said bars are horizontally reciprocal, and by means of the pins 62 are held in such a position that they can have no vertical movement. At various places upon said bar, preferably at the point where the slots are located, I provide upward inclines or shoulders 64, that engage the hooks 65 on the upper ends of the extension 66 from the straight-ticket bars 55. It is obvious from this description that when said horizontal bar 61 is operated—for example, moved to the left in machines made as that shown in the drawings—the inclined faces 64 will elevate the straight-ticket bar and thereby vote all the straight tickets with which the said horizontal bar may be connected. I place the sections of the voting-machine for voting the various classes of tickets side by side and connect one of these horizontal bars 61 up with all the straight-ticket bars that are used for voting for the candidates of any one party. For example, the lower horizontal bar shown in Fig. 1 is connected up with all the Democratic straight-ticket bars in all the sections, so that when said bar 61 is moved to the left a vote for every candidate on all the Democratic tickets will be counted. I provide a key 67 on such horizontal bar 61, which extends through the slot 68 in the face-plate 69 in the upper portion of the machine, so that by operating any one of said keys 67 I vote a full straight ticket. I provide the spiral spring 69, secured at one end to the base-plate and at the other end to the horizontal bar 61, so that they will, as soon as said bars have been actuated for voting purposes, return to normal position.

Of course it is understood that the usual party-emblems heretofore employed on ballots will be continued on my machine, as is shown in the drawings. I also place the name of the party on the face-plate 69 just over the straight-ticket keys 67. Of course the emblems could here be used instead of the names of the parties. At the top of each section I place the name of the class of ballots that are to be voted in such section, whether national, State, or county.

What I have hereinbefore described presents my voting-machine in the form I have designed it for the purpose of casting one vote for each candidate that has been nominated by recognized political parties and has obtained a position upon the official ballot; but in some States it is required, and it is often desirable, that means be provided for voting for candidates who have not been so nominated by regular political parties—that is, whereby a voter is enabled to cast a vote for any person. To this end I provide a mechanism shown in the right-hand columns of the various sections over which the word "Independent" is placed, as well as the symbol shown. Instead of providing in this section a transparent face-plate I provide the metal plate 70, which, however, is slidable and supported like the transparent plates in the other columns and for the same purpose. In addition, however, to the functions of the face-plates in the other columns, the metallic face-plate 70 in the independent column carries a registering mechanism. This registering mechanism is the same as that which has been hereinbefore described, excepting that the bearing-pins 4 are secured to the face-plate. Hence the registering-wheels are mounted on the face-plate 70 instead of the base-plate of the machine. In said plate 70 I provide horizontal slots 71 just beneath the names of the offices, into which ballots containing the name of the person voted for for such office may be inserted.

It is obvious that the ballots employed should be the exact size of the slots, so that only one ballot can be inserted at a time. The ballot 72, as it is being or has just been inserted, is shown in Fig. 9.

Within the cavity behind the metallic face-plate 70 I provide another plate 73, that is vertically reciprocated in suitable guideways by the lever 74, that is pivoted to the cross-bar 52 by the pivot 75. One end of said lever is connected pivotally to the arm 76, extending downward from the plate 73. The other end of said lever is pivotally connected to the vertical reciprocable bar 42. Since that bar 42 is actuated by the resetting mechanism from the platform, as we have seen, when the voter is standing on the platform ready to vote it is depressed thereby, causing the elevation of the plate 73 to the position shown in Fig. 9. Horizontal slots 77 are provided in the plate 73, that register with the slot 71 in the face-plate 70 when the said plate 73 is in its elevated position. Said slots are preferably of just the same dimensions as the ballots. When, therefore, a ballot is inserted, as seen in Fig. 9, it extends through the slot 77 and abuts against the base-plate, so that a second ballot cannot possibly be inserted by the same voter.

In front of the face-plate 70 I mount a series of covers 78, one for each office. The right-hand end of said cover is carried by the key 79, secured to the upper end of an arm that is in all respects the same as the arm 20, heretofore described. The shank of such key extends through a slot in the face-bar 16, that is in all respects similar to the slot 19, heretofore described, that is in the face-bars. The left-hand end of such covers 78 is carried by the pin 80, that extends through the slot 81 in the face-bar 16, which is similar in all respects to the slots 19, heretofore described. In said covers I provide horizontal slots 82, that register with the slot 71 in the face-plate 70 when the cover is elevated, but will not do so when the cover is depressed, and then the slot 71 in the face-place 70 is inaccessible. When the voter desires to cast a vote for an independent candidate, he operates a key 15, which elevates the cover 78 and moves said bar laterally to the left also. Such movement of the cover enables him to insert his ballot and it also actuates the locking-bar 3 by the end of the pin 80 engaging the end of the locking-bar and pushing it over and actuating it just as it would be actuated by any other key in the machine. It is obvious that when he has thus voted for an independent candidate the machine is locked, so that he cannot vote for any other candidate for the same office. In order to drive the registering and indicating mechanism in the independent column, I employ the arm 24, pivoted to the face-plate instead of the base-plate and carrying on its upper end the pawl 26, which engages the registering-wheel. Said arm 24, however, is mounted in a position parallel with and adjacent to the arm 20, which carries the key 15, so that the operation of the key will actuate the mechanism without the intervention of anything between the arms 20 and 24. The registering and indicating mechanism will show the total number of votes cast for independent candidates for any office.

After the voter has left the platform or booth the resetting mechanism will reset the locking-bars, as hereinbefore explained, and will draw down the plate 73 into the position shown in Fig. 10, permitting the independent ballots to be deposited into some receptacle at the lower end of the chamber behind the face-plate 70. From this chamber or ballot-box 83 the independent ballots may be taken by the election officials and counted. The ballots thus collected for independent candidates for any office must agree with the numbers shown by the indicating mechanism. I provide also in this connection a straight-ticket bar like the other straight-ticket bars, so that if the voter wishes to vote for independent candidates altogether he can adjust the covers simultaneously and deposit his ballots, as has been explained.

It is in some places required by law and is often desirable to vote for multiple candidates for the same office where there are multiple tickets. I provide a repeater attachment to my machine for this purpose, the same being shown in the left-hand column of the right-hand section of my machine. It is preferably slipped in between suitable guideways, so that it is detachably secured to the machine, and consists of a back plate 84. On this back plate I mount a disk 85, having on its periphery a series of teeth 86, one for each time that it may be desired to unlock this part of the mechanism—that is, with the total number amounting to one less than the number of candidates for whom you wish to vote. Such disk is provided with a series of teeth or pins 87. The teeth 86 are engaged by a hook or pawl 88 on the spring 89, that is secured to the back plate 84, so that an end extending away from the disk will be engaged by the pin 90 on the unlocking-bar 32, and when said unlocking-bar is elevated the catch or pawl 88 will disengage the disk 85 and permit said disk to be returned to its normal position by the spring 91, which has one end secured to the arbor 92, on which the disk is mounted, and the other end to the base of the unlocking-key 93. The arbor 92, which extends loosely through the disk 85, has its other end squared and fitting loosely in a square aperture in the back plate 84, as seen at 94 in Fig. 17.

Extending perpendicularly from the face of the disk 85 there is a series of pins 87, being the same in number as the teeth 86 on the periphery and also distributed in the same way. The function of these pins I will hereinafter explain, but I desire here to say that the teeth 86 on the periphery might be dispensed with and the catch 88 on the spring 89 be made to engage said pins instead. The operation would be just the same.

Over the disk 85 in the mechanism which has just been described, as seen in Fig. 13, I place a disk or plate 96, as seen in Fig. 17. Said disk is provided with a central aperture that receives the end of the arbor 92 and another aperture through which the unlocking-key 93 extends. Extending inwardly and perpendicularly from said plate 96 are pins 97, that extend almost to the disk or wheel 85. The only function of this arrangement just described is to steady the parts of the machine, as independent of that it could be dispensed with without affecting the operation of the machine in any way. The mechanism that has been described is covered by a suitable face-plate 98, having an aperture or hole to fit over the front end of the arbor-plate 92. The face-plate is also screwed or otherwise secured to the back plate 84, so as to be held rigidly in place. It is provided also near its center with a segmental or C-shaped slot 99, through which the unlocking-key 93 extends and operates. This whole mechanism is mounted in horizontal guides 100, to be seen in Fig. 1, and the width of the mechanism is somewhat less than the width of the column in which it is placed, so that this mechanism can be moved into engagement with the rest of the voting-machine by the voter when he desires to cast a multiple vote, and when the voter leaves the booth or platform the resetting mechanism moves it back into the position shown in Fig. 1. By the arrangement hitherto described the voter can vote for a given number of the multiple candidates upon multiple tickets regardless of this repeater attachment, but it is obvious that the regular mechanism hereinbefore described prevents him from voting for two or more candidates upon the same cross-row of the multiple tickets. By this attachment the voter will be enabled to avoid the restrictions heretofore placed upon him, so that he can vote for two or more multiple candidates positioned horizontally upon the same line. To this end the locking-bars 3 are provided on the left-hand ends, when the machine is placed as shown, with the extensions 101, (seen in Fig. 17,) that may have the angular finger 102, if desired, extending toward the multiple-voting attachment which I have provided. When the multiple-voting attachment is shifted over by the voter, as heretofore has been explained, the extensions on the unlocking-bars are in close proximity to the series of locking-blocks 103, which slide longitudinally on the face-plate 98, being secured thereto by suitable pins or lugs 104, that extend through slots in said locking-blocks. These locking-blocks are of such length that their joints are in line with the ends of the locking-bars, and their abutting ends are preferably beveled, so as to permit the angular or wedge-shaped finger 102 to enter between two of such blocks, and when it does so the series of blocks on either side of it are pressed away from it. These blocks are so arranged that when one locking-bar has entered between a pair of them all the other blocks cannot be moved farther by an attempted entrance of the end of another unlocking-bar. This series of locking-blocks is an old means of enabling only one of a series of engaging devices to be operated. So here, after one candidate has been voted for and the locking-bar extension has been thereby pushed in between the locking-blocks, no other candidate on the multiple ticket can be voted for until such locking-bar has been pushed back into its normal position.

In order to effect this result, I provide a longitudinal plate 105, mounted on the face-plate 98, held in place by pins 106, secured in the face-plate and extending through slots 107 in the plate 105, such slots extending horizontally, so as to permit the lateral or horizontal shifting of said plate 105. The plate 105 is actuated by means of the pins 87 on the disk or wheel 85. These pins enter a slot or guideway 108, made in the plate 105. Said slot extends parallel with the plate 105, excepting at its ends, which curve away from said plate in order to permit the entrance and exit of said pins. It is clear that when the disk or wheel 85 is rotated by means of the unlocking-key 93 a pin will enter said slot and during the first half of its passage therethrough will push the plate 105 toward the ends of the locking-bars, so that if the end of any locking-bar has been moved in between the locking-blocks 103, as has been described, said plate will engage said locking-bar and push it back, thereby unlocking this part of the machine to enable the voter to vote for another name on the same cross-row or for a candidate on some other horizontal row. It is clear that he cannot vote a second time for the same candidate, because, as we have heretofore seen, the mechanism which actuates the register for any candidate cannot be operated a second time by the same voter, as the pawl that drives the register must be reset and cannot be reset until the voter has left the machine. This, however, is not true when the voter is permitted to vote a cumulative ticket, as will be hereinafter explained. As the pin 87 moves out of the slot 108 the plate 105 is drawn back into its normal position. By repeating the operation which I have just described—that is, by rotating the disk 85 by means of the unlocking-key 93—the voter is enabled to continue to vote for candidates for the office in question until the unlocking-key 93 has reached the limit of its movement. If a smaller number only can be voted for, the movement of the unlocking-key 93 may be limited by any suitable means or the attachment changed or a different attachment substituted.

The inner edge of the back plate 84, it will be observed in Figs. 13 and 14, is provided with inclined faces or shoulders 109, that are similar in all respects to inclines on the left-hand edge of the unlocking-bar 32, so that the two adjacent edges of the unlocking-bar 32 and the back plate 84 fit into each other, as shown in Fig. 14, or may be disengaged from each other, as shown in Fig. 13. When the multiple attachment is desired to be used, as has been explained, it is moved over toward the rest of the voting-machine until the back plate 84 comes into engagement with the unlocking-bar 32, as has been described.

It is observed that the inclines on the left-hand edge of the unlocking-bar 32 are the reverse of those on the right-hand edge, which are used to reset the locking-bars. By this construction it is clear that when the machine is reset as the voter leaves the platform the unlocking-bar 32 moves upward and the inclines on this right-hand edge reset the locking-bars, while the inclines on the left-hand edge move the multiple-voting attachment back into its normal position. To hold the multiple-voting attachment in place after it has been pushed over into engagement with the rest of the machine, I place a pin 110 on the unlocking-bar 32 and the spring 111 on the back plate 84 of the multiple-voting attachment having on its end an upwardly-extending catch 112 with an outer inclined face. When the multiple-voting attachment is moved over toward the main part of the voting-machine, the catch 112 moves under the pin 110, as seen in Fig. 14, and engages therewith, so that the multiple attachment cannot be withdrawn until the voter leaves the platform, whereupon the vertical movement of the unlocking-bar 32 will move the pin 110 out of engagement with the spring-catch 112. When the unlocking-bar 32 is elevated as the voter leaves the platform, it not only releases the engagement of the spring-catch 112 and pushes the multiple-voting attachment to the left, but, as has been described, elevates the end of the spring-catch 88 out of engagement with the disk or wheel 85, whereby the spring 91 returns said wheel or disk to its normal position.

By reference to the modified structure shown in Fig. 12 it is obvious by the extension of the arm 24, so as to engage the pin 29, the function of operating the locking-bar may be performed by the pawl mechanism that actuates the register, and the action of either the bar 32 or the bar 105 upon the front end of the locking-bar 3, through the pin 29 on the arm 24, will return the pawl mechanism to normal. In what is known as the "cumulative" system, wherein there may be minority or proportional representation, by the use of this construction, in combination with the repeating attachment which I have just described, the voter is enabled to cumulate his votes on any one of the multiple candidates for the same office up to the limit of the number provided for by the unlocking mechanism and no more.

It is also obvious that the angle-piece 22 is an intermediate, the chief purpose of which is to prevent any subsequent section of the locking-bar 3 following after any preceding section has been actuated. It is evident that this precaution is not necessary in the last or right-hand party division, so that it is preferable to use the construction as shown in Fig. 12 in this column in the regular machines. This construction may also be used in all the columns of the regular machines— that is, when the repeater is not used—thus placing all the actuation upon the pawl mechanism and limiting the angle-piece to the one function of a stop; but I do not consider this the preferable method.

What I claim as my invention, and desire to secure by Letters Patent, is—

1. In a voting-machine, a register, an arm pivoted at one end and carrying on its other end a pawl to actuate the register and held in contact by having passed the center of gravity, another arm pivoted at one end and carrying a voting-key, so arranged that the operation of the arm carrying the key will actuate the arm carrying the pawl and yet the arms be independent of each other, and means independent of the key for returning the pawl to its normal position after it has been operated.

2. In a voting-machine, a face-bar, a key for each candidate extending through said face-bar, a pawl mechanism actuated by said key, and a resetting-bar mounted on said face-bar adapted to engage said pawl mechanism after it has been actuated and return it to normal, said key, pawl mechanism, and resetting-bar all movable in parallel planes.

3. In a voting-machine, a register, a pawl mechanism for actuating the same, a sliding locking-bar, a driving angle piece or arm for actuating the locking-bar, a voting-key to actuate said angle-piece and pawl mechanism, said voting-key, angle-piece and pawl mechanism being independent of each other, means for resetting the locking-bar and angle-piece, and a sliding bar for resetting the pawl mechanism.

4. In a voting-machine, a register, a pawl mechanism to actuate the same comprising an arm pivoted at one end and carrying a pawl at its other end, a locking-bar, a drive angle-piece that is pivoted at one end and at the other end engages the locking-bar and which also engages and actuates the pawl mechanism, and a key that actuates the drive angle-piece.

5. In a voting-machine, a sectional bar, each section provided with pins or stops near its ends, an angle-piece pivoted at one end with its other end provided with a front face to engage and drive the forward section and a heel-piece to engage and stop the rear section, and a key for actuating such angle-piece.

6. In a voting-machine, a registering mechanism for each candidate, a pawl mechanism to drive such registering mechanism, a locking-bar for each row of candidates for the same office, means for actuating said locking-bars, means for actuating simultaneously the actuating means for both the registering mechanisms and the locking-bars, resetting-bars that engage and reset the register-actuating mechanisms, a resetting-bar that resets the locking-bars and their actuating mechanisms, and means for simultaneously actuating both classes of said resetting-bars.

7. In a voting-machine a group of independent machines or sections, a series of identical party divisions, a series of candidate-keys in each party division, a series of straight-ticket bars, one for each division in each machine or section, each when operated simultaneously actuating all the keys in its division, and a series of bars each of which is connected up with all the straight-ticket bars of one party division in all the machines or sections and which when operated simultaneously actuates all of such straight-ticket bars.

8. In a voting-machine, a group of independent machines or sections, a series of identical party divisions, a series of candidate-keys in each party division, a series of straight-ticket bars, one for each party division which when operated simultaneously actuates all the keys in its division, a series of horizontal bars slidably mounted on the base-plate of the machines, each provided with an inclined shoulder that engages the upper end of all the locking-bars of all the machines or sections that are devoted to the same party, and which when operated elevates said straight-ticket bars, a key on each of said horizontal bars for actuating the same, and springs for returning said bars to their normal position.

9. In a voting-machine, the combination with suitable voting mechanisms and locking-bars for multiple candidates for the same office on multiple tickets, of a repeater that is slidably mounted so that it can be moved into or out of engagement with the machine at the option of the voter.

10. In a voting-machine, the combination with suitable voting mechanisms and locking-bars for voting for multiple candidates on multiple tickets, and an unlocking-bar for resetting said locking-bars, of a repeater slidably mounted in the framework which, at the option of the voter, may be moved into engagement with said unlocking-bar, the engaging face of said unlocking-bar and of the repeater being so formed that when said unlocking-bar is operated it will simultaneously reset the locking-bars and also the repeater.

11. In a voting-machine, the combination with suitable locking-bars, an unlocking-bar for resetting said locking-bars having on its outer edge an inclined surface or shoulder, a repeater slidably mounted in the framework and having a back plate whose edge is provided with an inclined shoulder that engages a similar inclined shoulder on the unlocking-bar, and means for holding the repeater in engagement until the machine is reset.

12. In a voting-machine, the combination with a series of locking-bars for multiple candidates for the same office on multiple tickets, of a repeater provided with a series of locking-blocks slidably mounted therein with their abutting ends in a line with the ends of the locking-bars and so arranged that only one locking-bar can be inserted between them at one time and means on the repeater for resetting the locking-bar.

13. In a voting-machine, the combination with a series of locking-bars for multiple candidates for the same office on multiple tickets, of a repeater provided with a series of locking-blocks slidably mounted therein with their abutting ends in a line with the ends of the locking-bars and so arranged that only one locking-bar can be inserted at one time, a sliding plate mounted therein adapted when operated to engage the end of the locking-bar which has been inserted between the blocks and return the same to its former position, and means for actuating said sliding bar.

14. In a voting-machine, the combination with a series of locking-bars for multiple candidates for the same office on multiple tickets, of a repeater provided with a series of locking-blocks slidably mounted therein with their abutting ends in a line with the ends of the locking-bars and so limited in their movement that only one locking-bar can be inserted between them at one time, a sliding bar mounted therein adapted when operated to engage the locking-bar which has been inserted between the blocks and return it to its former position, said sliding plate being provided with a longitudinally-extending slot, a disk or wheel rotatably mounted in the repeater provided with pins that pass through such slot when the disk is rotated and reciprocate said sliding plate, and means for rotating said disk.

15. In a voting-machine, the combination with a series of locking-bars for multiple candidates for the same office on multiple tickets, and an unlocking-bar for resetting the same, of a repeater provided with means for preventing the operation of all but one of such locking-bars at one time, a laterally-sliding plate which when operated returns the locking-bar that has been operated to its normal position, said sliding plate being provided with a longitudinal slot, a disk or wheel rotatably mounted in the repeater provided with pins that pass through the slot in the sliding plate when the disk is rotated and reciprocate said sliding plate, a key for rotating said disk, a spring to return the disk after it has been operated to its normal position, a catch that holds said disk in position after it has been operated, and means on the unlocking-bar for disengaging such catch when the machine is reset.

16. In a voting-machine, the combination with a suitable registering mechanism and locking-bar, of a drive mechanism which simultaneously actuates both, and a repeater whereby the voter may unlock the locking-bar a given number of times.

17. In a voting-machine, a series of registering and indicating mechanisms, one for each candidate, ballots slidably mounted in the framework of the machine with apertures that register with the numerals on the indicating mechanisms, and a series of rocking bars, one for each ballot, that hold the ballots up in a position to conceal the numerals on the indicating mechanisms, and means for simultaneously actuating the series of rocking bars.

18. In a voting-machine, the combination with a series of horizontal locking-bars, one for each row of candidates for the same office on the regular tickets, an independent-ballot box whose front face is provided with a series of slots to receive the ballots, one slot being provided for each office, a series of covers, one for each office to cover the slots in the face-plate, each plate being provided with a slot that registers with the slot in the face-plate when the cover is moved, a key for moving each cover so arranged as to simultaneously move said cover somewhat upward and horizontally, and a pin secured to the end of each cover that moves in a guideway parallel with the movement of the actuating-key and which when moved actuates the locking-bar for the candidates for the same office on the regular tickets, whereby when an independent ballot has been cast for any office the voter cannot vote for any candidate for the same office on the regular ticket.

19. In a voting-machine, the combination with a series of sectional horizontal locking-bars, one for each row of candidates for the same office on the regular tickets, and means for operating the sections of such locking-bars and of locking the same after a section is operated, of an independent-ballot box whose front face is provided with a series of slots to receive the ballots, one slot being provided for each office, a series of covers, one for each office to cover the slots in said face-plates, and each cover abutting against the end of one of said locking-bars when the cover has been actuated, whereby said cover cannot be moved for the insertion of an independent ballot after a vote has been cast for any candidate on the regular tickets for the same office.

20. In a voting-machine, an independent-ballot box whose front face is provided with a series of slots to receive the ballots, there being one slot for each office, a chamber behind said face-plate whose dimensions from front to rear are substantially the same as that of the ballot, a vertical movable sliding plate within said chamber provided with slots which when said plate is in its upward position registers with the slots in the face-plate, suitable means for connecting said plate with the resetting mechanism of the machine, whereby after the voter has inserted his ballot, it will remain in the slot until he has left the platform of the machine, then the resetting mechanism of the machine will depress such vertically-moving plate and the ballot will be deposited.

21. In a voting-machine, an independent-ballot box whose front face is provided with a series of slots for the admission of ballots, there being one ballot for each office and said slots being of substantially the same dimensions as the ballots, a chamber behind the face-plate whose dimensions from front to rear are substantially the same as that of the ballot, a vertical plate centrally located in said chamber and movable in suitable guideways and provided with a series of slots which register with the slots in the face-plate when the vertically-movable plate is in an upward position, a lever centrally pivoted to the framework of the machine with one end pivotally connected up with the vertically-movable plate, a vertically-movable resetting mechanism for the machine to which the other end of said lever is pivoted, and means whereby said resetting mechanism is operated when the voter leaves the machine.

22. In a voting-machine, a registering and indicating mechanism, a movable plate having slots to receive a ballot and apertures that register with one numeral on each indicating-wheel, a cover for the slots and the apertures, a key that simultaneously actuates the register and removes the cover from the slots, and means for moving the plate and revealing the numerals at the close of the election.

In witness whereof I have hereunto set my hand this 22d day of February, 1896.

EDWIN B. CUMMINGS.

Witnesses:
O. C. DEMOTT,
S. M. SHEPARD.